US012355331B2

(12) United States Patent
Subramoniam et al.

(10) Patent No.: US 12,355,331 B2
(45) Date of Patent: Jul. 8, 2025

(54) ELECTRIC MACHINE UNIT

(71) Applicant: TVS MOTOR COMPANY LIMITED, Chennai (IN)

(72) Inventors: Chidambaram Subramoniam, Chennai (IN); Thamilarasan Balakrishnan, Chennai (IN)

(73) Assignee: TVS MOTOR COMPANY LIMITED, Chennai (IN)

( * ) Notice: Subject to any disclaimer, the term of this patent is extended or adjusted under 35 U.S.C. 154(b) by 249 days.

(21) Appl. No.: 18/013,804

(22) PCT Filed: Oct. 10, 2020

(86) PCT No.: PCT/IN2020/050872
§ 371 (c)(1),
(2) Date: Dec. 29, 2022

(87) PCT Pub. No.: WO2022/003708
PCT Pub. Date: Jan. 6, 2022

(65) Prior Publication Data
US 2023/0361647 A1   Nov. 9, 2023

(30) Foreign Application Priority Data

Jun. 29, 2020   (IN) .............................. 202041027651

(51) Int. Cl.
*H02K 7/00*   (2006.01)
*H02K 5/20*   (2006.01)
(Continued)

(52) U.S. Cl.
CPC ............... *H02K 7/006* (2013.01); *H02K 5/20* (2013.01); *H02K 9/06* (2013.01); *H02K 11/20* (2016.01); *H02K 16/00* (2013.01)

(58) Field of Classification Search
CPC ............ H02K 7/006; H02K 5/20; H02K 9/06; H02K 11/20; H02K 16/00
See application file for complete search history.

(56) References Cited

U.S. PATENT DOCUMENTS

2010/0327791 A1   12/2010   Casey
2011/0189937 A1*  8/2011   Hasegawa ............. F24F 12/006
                                                              454/239

FOREIGN PATENT DOCUMENTS

CN      102868267 A       1/2013
CN      210246541 U   *   4/2020
                (Continued)

OTHER PUBLICATIONS

JPH06121500A_translate (Year: 1998).*
(Continued)

*Primary Examiner* — Tulsidas C Patel
*Assistant Examiner* — Mohammed Ahmed Qureshi
(74) *Attorney, Agent, or Firm* — Osha Bergman Watanabe & Burton LLP

(57) ABSTRACT

An electric machine unit for a motorized device, said electric machine unit includes: a rotor assembly including rotor members, and a rotor shaft configured to support said rotor assembly, with said rotor assembly being capable of rotating along with said rotor shaft; and a stator assembly including stator members, with each stator member being configured to work in conjunction with a corresponding rotor member of the rotor members, and a mode selector configured to enable operation of one or more of said stator members to rotate said rotor shaft depending one or more parameters of said motorized device.

10 Claims, 7 Drawing Sheets

(51) Int. Cl.
  *H02K 9/06* (2006.01)
  *H02K 11/20* (2016.01)
  *H02K 16/00* (2006.01)

(56) References Cited

FOREIGN PATENT DOCUMENTS

JP         H06121500 A  *  4/1998
WO    WO-2019086449 A1  *  5/2019  ............. B60L 50/64

OTHER PUBLICATIONS

CN-210246541-U_translate (Year: 2020).*
International Search Report issued in corresponding International Application No. PCT/IN2020/050872, dated May 19, 2021 (5 pages).
Written Opinion issued in corresponding International Application No. PCT/IN2020/050872, dated May 19, 2021 (8 pages).

* cited by examiner

ELECTRIC MACHINE UNIT

TECHNICAL FIELD

The present subject matter relates to an electric machine unit for a motorized device, including but not limited to motor vehicles.

BACKGROUND

Generally, motorized devices like motor vehicles, which are powered by an internal combustion (IC) engine are popularly known. The IC engine acts as a power unit for the motor vehicle to drive the motor vehicle. The IC engines expel exhaust gases generated during combustion process into the atmosphere. There is a significant proportion of energy loss happening during this process. In addition to energy loss due to scavenging of the exhaust gases, the energy is also lost due to friction, during cooling etc. Thus, the energy efficiency of an IC engine is considered to be poor in spite of its popularity.

In the recent times, electric machines in motor vehicles are gaining popularity due to their higher energy efficiency. The electric machines are greener compared to the IC engines. The electric machines are being used as a prime mover or as an assisting system for the IC engine in the motor vehicles. Typically, the electric machines are driven by an on-board power source of the motor vehicle. Power is delivered to the electric machine in a controlled manner by a control unit. The on-board power source can be charged from an external power source or it can be charged by the electric machine, which is capable of operating as a generator. There is a continuous effort to improve the efficiency of the motor vehicle and improve the range of the motor vehicle. In other words, it translates to reduced frequency of charging of the power source.

BRIEF DESCRIPTION OF DRAWINGS

The detailed description is described with reference to the accompanying figures, which is related to a two-wheeled motor vehicle being one embodiment of the present invention. However, the preset invention is not limited to the depicted embodiment(s). In the figures, the same or similar reference signs are used throughout to represent similar features and components.

FIG. 2 (*b*) illustrates a schematic view of an electric machine unit, in accordance with an embodiment of the present subject matter.

FIG. 5 (*b*) illustrates a method of operation of an electric machine unit, in accordance with an embodiment of the present subject matter.

DETAILED DESCRIPTION

Figure 1:
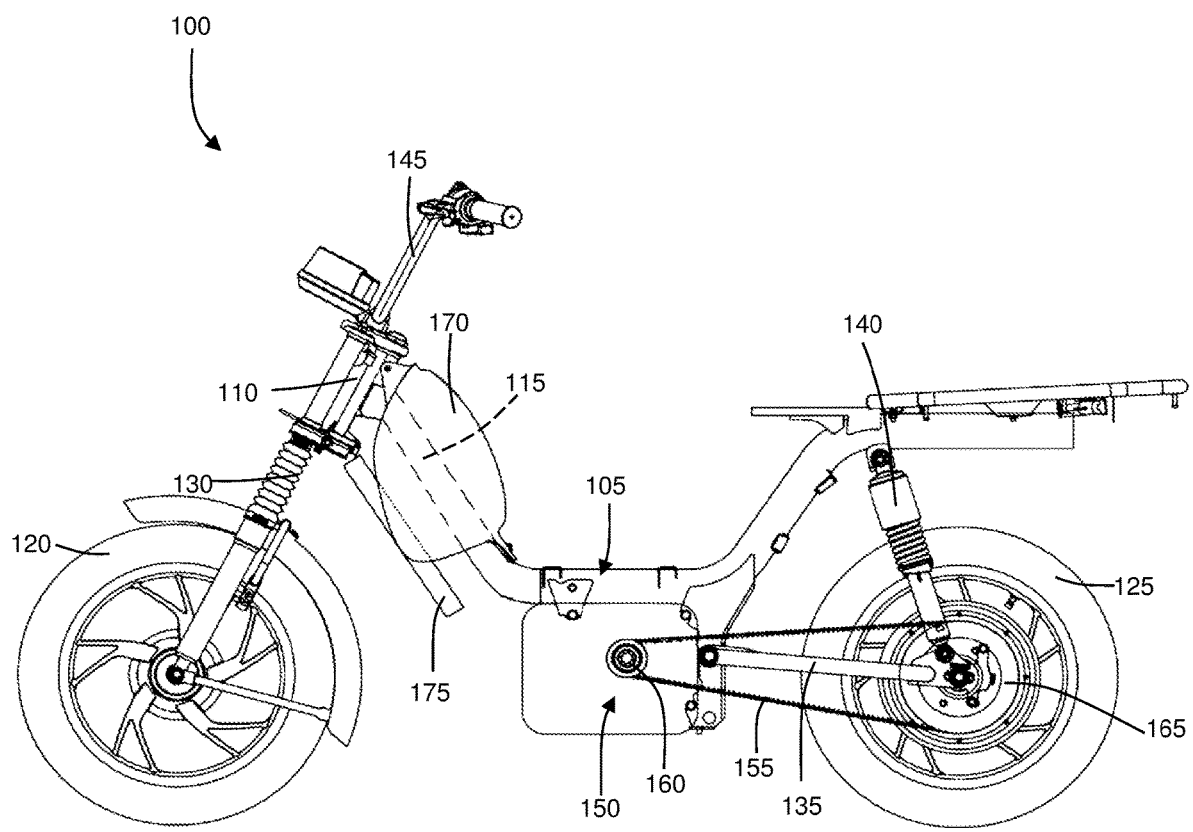
FIG. 1 illustrates a left-side view of an exemplary motorized device, in accordance with an embodiment of the present subject matter.

In addition to concern related to efficiency; reduced exhaust emission targets, depleting non-renewable resources and increasing pollution levels are accelerating adoption of electric machines in the motor vehicles. The electric machines are being adapted even in compact two-wheeled and three-wheeled motor vehicles. However, there are many challenges associated with incorporation of electric machines in the two-wheeled and three-wheeled motor vehicles. For example, due to compact layout of the two- or three-wheeled motor vehicles, a storage space available for packaging of a larger capacity power source is limited. For that matter, even small capacity cars and quadricycles face similar problem of storage space for the power source. When large capacity power sources like large battery packs are accommodated on these small capacity motor vehicles, the utility space on the motor vehicles is compromised. For example, in two-wheeled motor vehicles, a helmet storing space or load carrying space is compromised in order to package the power source. Similarly, in case of three-wheeled motor vehicles, small capacity cars and in quadricycles, a luggage storing space is compromised to package the power source. The luggage storage space, which is critical on such motor vehicles, is taken up by the power source. This problem is prominent in hybrid vehicles, because the electric machines are used in conjunction with the IC engines. Thus, packaging space has to be created on the motor vehicle for both prime movers viz. the electric machine and the IC engine. Moreover, similar to the power source for the electric machine, systems associated with the IC engines are also to be packaged on the motor vehicles. Those systems can be fuel storage unit, air induction system, ignition related electronics etc. Hence, the major challenge is to package a large capacity battery, as range of the motor vehicle, in electric mode, is dependent on capacity of the power source. However, due to aforementioned challenges, many a time, a smaller capacity battery is provided on the motor vehicle to retain utility space. Because of the small capacity battery, the motor vehicle can be operated for shorter ranges and only at low power.

Conventionally, the electric machine in the motor vehicle is either wheel-hub mounted or is chassis mounted. The electric machine acts as a traction motor, which receives electric power from the power source. The electric power is converted to mechanical work to drive the motor vehicle. For example, a brushless direct current (BLDC) motor is popularly used in certain applications to act as the prime mover. The electric machine should be capable of delivering high torque during starting or hill-climb conditions and a high speed during cruising or similar operating conditions.

However, in order to reduce cost, to reduce power consumption and due to the packaging challenges as discussed above, a low capacity (wattage) electric machine is used in the aforementioned small capacity motor vehicles. However, such electric machines cannot cater to certain operating conditions like climbing hilly roads due to their poor torque and poor power delivering capability. A high capacity electric machine may be used to cater to certain riding conditions that require high power, but consumption of power is higher in such configurations. Even though driving requirements are catered to, the power consumption is higher in such electric machines. The higher power consumption would result in a very limited driving range. This creates range anxiety in riders, which is undesirable. Moreover, the power source requires frequent charging, resulting in faster depletion of energy and frequent charge-discharge cycles.

Further, when using a larger electric machine, various losses that occur in the electric machine are also higher. The various losses include copper losses, core losses, mechanical and stray losses to name a few. The copper loss is proportionate to a square of a current passing through windings in the electric machine. Since, the larger electric machines comprise larger windings, the amount of copper losses are higher. Moreover, loss of energy occurs in the form of heat generation. Excessive heat affects operational characteristics of the electric machine thereby deteriorating performance of the electric machine when used for longer duration. Similarly, core losses are caused due to eddy currents that are induced in the core as well as due to hysteresis losses. Such core losses are also higher in the large capacity electric machines as the current flows through the windings during all operational conditions of the motor vehicle. Thus, the efficiency of the electric machine is poor when a larger electric machine is used.

Few attempts were made in the prior art to address some of the above problems. For example, one of the attempts discloses a stackable brushless direct current (DC) motor. The DC motors can be stacked according to the rider requirement and depending on driving condition. Such a configuration still has the problem related to losses when a large stack is used. Moreover, such a design cannot support varying power demands on the go. For example, the characteristics of a high-power machine are required during starting and the characteristics of a low power machine is sufficient to cruise at high speeds. Such requirements cannot be met by a single stacked motor. Hence, this cannot be considered as a viable solution.

Few other attempts are made in the prior art by modifying the electrical machine. However, the modifications made to the electrical machine require multiple stud connection on a casing of the electrical machine. Further, the stud connections are to be connected to multiple controllers. Typically, controllers used to operate the electrical machines are bulkier. These controllers operate at high currents in order to operate the electrical machine. The controller uses sophisticated and high temperature resistant power electronics. Further, these controllers dissipate lot of heat due to their operation with high currents. The controller is operational during almost entire operation time of the motor vehicle. Thus, heat is dissipated during entire operation of the motor vehicle. Typically, large heat sinks are provided for each of the controller for heat dissipation. Thus, the known configuration of electrical machines come with bulkier controllers and are expensive. Magnitude of the problem is higher as multiple controllers are used. Moreover, an additional challenge when considering the compact motor vehicle like two-wheeled or three-wheeled or compact four-wheeled motor vehicle is to package all the controllers on the motor vehicle. The multiple controllers are to be spaced apart for heat effective dissipation, which requires lot of space on the motor vehicle.

Thus, there is a need for an electric machine unit that addresses the aforementioned and other problems in the prior art. The electric machine unit should be capable of generating high torque when required. At the same time, the electric machine unit should be consuming low power during certain riding conditions. Even a low capacity power source should be capable of catering to the power requirements of the electric machine without creating any range anxiety. The electric machine unit should of low-cost without the need for multiple controller components.

The present subject matter provides an electric machine unit comprising a rotor assembly. The rotor assembly comprises a plurality of rotor members. Each of the rotor members comprising a plurality of magnetic members. In one embodiment, North and South poles of the magnetic members are disposed in alternating pattern on each rotating member.

In one embodiment, the electric machine unit comprises a rotor shaft. The rotor shaft is a common member that supports the entire rotor assembly. In one implementation, the plurality of rotor members is aligned axially on the rotor shaft. The rotor assembly rotates along with the entire rotor shaft. In one implementation, the rotor shaft is rotatably supported in the electrical machine unit by one or more rotation support members including bearings or the like.

In one embodiment, the electric machine unit comprises a stator assembly. The stator assembly comprises a plurality of stator members. The plurality of stator members corresponds to the plurality of the rotor members. For example, if the rotor assembly is formed by three rotor members then the stator assembly is formed by three stator members, which correspond to the three rotor members. Each stator member comprises a plurality of teeth and slots. Electrical conductors are wound about the teeth. The electrical conductors are induced with current and voltage in a controlled manner by a control unit.

In one embodiment, the electric machine unit comprises a mode selector. The mode selector is configured to enable operation of one or more of the plurality of stator members depending on or more parameters of the motorized device. The one or more parameters of the motorized device like a motor vehicle includes a throttle input by rider, a speed of the motor vehicle, battery state of charge (SoC), or a load on the motorized device.

The electric machine unit of the present subject matter provides a mode selector that is capable of enabling one or more stator members to operate without the need for using multiple control unit to operate individual stator member.

A single control unit can be used to induce voltage, in the form of pulses, and desired current, which is drawn from a power source. The electric machine unit eliminates the need for using multiple controllers, and thereby makes the system as per present invention, light weight, compact as well as inexpensive. The present subject matter provides a system/unit that can be operated by a single control unit making it a low-cost design. Moreover, need for dedicating space on the motorized device for multiple control unit is avoided. The single control unit can be optimally packaged on the motorized device achieving a compact layout say even on a compact motor vehicle. Further, through the same control unit power is supplied to the one or more stator members by supplying power from the power source.

Depending on the number of stator members that are operated, the corresponding rotor members engage with a magnetic flux generated by the stator members. The number of rotor member that are engaged assist the rotor shaft in rotating. The rotational force of the rotor shaft is transferred to one or more wheels of the motorized device. In one embodiment, the rotor assembly and the stator assembly are packaged in a casing. The rotor shaft comprises at least a portion which protrudes out from the casing.

Further, a small capacity power source can be used to drive the electric machine unit and other components since the entire capacity of the electric machine need not be operated always. In other words, when only few stator members of all the stator members are operated by the mode selector, less power is consumed as compared to full capacity operation of the electric machine unit.

The small capacity battery can be optimally packaged even on a small capacity motorized device like two- or three-wheeled vehicle, a quadricycle, a small capacity four-wheeled vehicle or the like. The need for compromising on a utility space on the motorized device is eliminated. Moreover, through the mode switch, the electric machine unit can be operated in low capacity configuration (say operating minimal number of stator and corresponding rotor assemblies) whereby maximum range can be achieved. This reduces any range anxiety in the rider.

Furthermore, all the stator members need not be operated during entire duration of operation of the device, as a result the cumulative losses in the electric machine unit are less. High currents are transferred through all the windings in only certain conditions where high power or high torque is required. Thus, copper losses and core losses are reduced as currents are transferred through all the windings only in selected conditions. Moreover, due to the optimum operation of the electric machine unit achieved due to current flow only in the operational stator (windings), the heat generation due to losses is reduced. As heat generated is reduced, the electric machine unit can be optimally operated without any effect of heat on performance thereof In one embodiment, the mode selector is an electromechanical switch. The mode selector can be operated by a user of the motorized device. A rider operable switch, which can be operated by the rider causes mechanical movement of the mode selector. In one embodiment, the mode selector is configured to establish electrical connection between one or more windings of the stator assembly thereby bringing into operation one or more stator members. The single control unit induces current and voltage across the one or more windings that are brought into operation by the mode selector. Thus, the electric machine unit can be operated optimally with minimal electronic/electrical components making it a cost-effective design.

In one embodiment, the mode selector is an electromechanical switch. The mode selector is capable of being operated by an operating member operable by a control unit of the motorized device. In one embodiment, depending on one or more motorized device parameters including a user input, the control unit actuates the operating member. The operating member causes mode selector to enable operation of one or more stator members (windings). The operating member may include a servo motor, a solenoid member or the like.

In one embodiment, the mode selector is integrally formed with a control unit of the motorized device. The mode selector can be an electronic switch formed by a semiconductor component. The user provides input to the control unit and the control unit depending on one more motorized device parameters, including user input (say throttle input), operates the mode selector to operate one or more stator members of the electric machine unit. This further reduces the number of components that are to be accommodated on the motorized device.

In one embodiment, the mode selector operates two or more stator members cumulatively of the plurality of stator members depending on the one or more parameters of the motorized device. Two or more stator members are cumulatively connected by the mode selector to operate the corresponding motor modules depending on power and torque requirements of the motorized device.

In one embodiment, the mode selector of the electric machine unit is configured to operate any one or more stator members of the plurality stator members depending on the one or more parameters of the motorized device. For example, the mode selector is configured to select one stator member depending on requirement of motorized device and the mode selector is configured to select another stator member depending on a different requirement of the motorized device.

In one embodiment, the rotor assembly and the stator assembly are housed within a casing of the electric machine unit. Use of a single integrated casing reduces cost and assembly time. Further, the casing provides complete protection to the rotor assembly and the stator assembly.

In one embodiment, the rotor shaft supports an intake fan and an exhaust fan disposed at axial ends of the rotor shaft. The intake fan and the exhaust fan are enclosed by the casing. In one implementation, the plurality of stator members is aligned axially and the intake fan is disposed adjacent to the stator members that are disposed on either end. The fans enable agitation of air within the casing thereby enabling uniform distribution of heat within the casing. Thus, even if a single stator member is operated by the mode selector, the fans cause the air to circulate within the casing thereby reducing heat accumulation at one or more pockets in the electric machine.

In one embodiment, the casing is connected to a unit-inlet for supplying purified air from a filter unit. The intake fan is configured to suck air and direct air into the casing towards the stator members in a forced manner for effective cooling. The air gets circulated within the casing and the exhaust fan is capable of directing air out through a unit-outlet connected to the casing. In one implementation, the unit-inlet and the unit-outlet are one-way valves that allow air flow in only one direction. Thus, the electric machine unit is provided with requisite cooling, especially when more than one stator member is operated by the mode selector.

In one embodiment, the filter unit is connected to a cooling unit. Air is filtered at the filter unit and is transferred to the cooling unit. The cooling unit is capable of reducing temperature of air before sending it to the unit-inlet for improved cooling.

In one embodiment, the cooling unit is mounted to a frame assembly of the motorized device. In one implementation, the cooling unit is disposed in the vicinity of one of at least one front wheel and at least one rear wheel of the motorized device. For example, in the motorized devices with rider and/or passenger cabins, the electric machine unit is disposed substantially in proximity to the at least one rear wheel. In case of saddle-ride type motorized devices, the cooling unit is preferably disposed in proximity to the at least one front wheel to take advantage of flowing frontal air for effective cooling. However, even in the saddle-ride motorized devices, the cooling unit may be disposed towards a lateral side and in proximity to the at least one rear wheel.

The electric machine configuration may be implemented in any two-wheeled or three-wheeled motorized device, a small capacity car or a quadricycle. The scope of the present subject matter is not limited to motorized device but includes electrical applications requiring variable torque and power requirements with the objective of optimum power consumption. However, for the purpose of explanation and by no limitation, the electric machine, corresponding additional advantages and features are described through the following embodiments. Arrows wherever provided on top right corner of the figure represent direction with respect to motorized device. Arrow F represents forward direction, arrow R represents rearward direction, arrow UW represents upward direction and arrow DW represents downward direction.

FIG. 1 illustrates a left-side view of an exemplary motorized device 100, in accordance with an embodiment of the present subject matter. The motorized device of the present embodiment is a motor vehicle. For sake of explanation, the motor vehicle may be considered as the exemplary motorized device hereinafter. The motorized device 100 comprises of a frame assembly 105 acting as a structural member of the motorized device 100. The frame assembly 105 comprises a head pipe 110, and a main tube 115 extending rearwardly downward from the head pipe 110. The motorized device 100 comprises at least one front wheel 120, and at least one rear wheel 125. The at least one front wheel 120 is supported by a front suspension 130. In one embodiment, the at least one rear wheel 125 is swingably supported by a swing arm 135. One end portion of the swing arm 135 is pivoted to the frame assembly 105 and other end portion of the swing arm 135 supports the at least one rear wheel 125. Further, a rear suspension 140 is disposed connecting the swing arm 135 to the frame assembly 105. The motorized device 100 comprises a handlebar assembly 145 that is rotatably supported by the frame assembly 105. Using the handlebar assembly 145, a rider can manoeuvre the motorized device 100.

In one embodiment, an electric machine unit 150 is mounted to the frame assembly 105. In one implementation, the electric machine unit 150 is rigidly secured to frame assembly 105 in a slung manner. In another implementation (not shown), the electric machine unit 150 is secured to the swing arm 135 and is disposed forward to the at least one rear wheel 125. The electric machine unit 150 can drive the at least one rear wheel 125. An output of the electric machine unit 150 is transferred to the at least one rear wheel 125 through a transmission system 155. In one embodiment, the electric machine unit 150 comprises an output shaft (not shown) and the output shaft is provided with a drive member 160. Correspondingly, the at least one rear wheel 125 is provided with a driven member 165. The drive member 160 and the driven member 165 may be a sprocket or similar members. The transmission system 155 may include a belt, a conventional chain, a silent chain, a shaft drive, or the like to connect the drive member 160 and the driven member 165. In another implementation, a geared transmission system, a continuously variable transmission (CVT) system, automatic manual transmission (AMT) system or any other known transmission can be used along with the electric machine unit 150 to meet various torque and power demands of the motorized device 100.

In one embodiment, a storage unit 170 is mounted to the main tube 115 of the frame assembly. The storage unit 170 is configured to support a power source (not shown) like a battery pack, a fuel cell, a flow cell or the like. The power source can be disposed at another location on the motorized device depending on layout of the motorized device. Further, the motorized device 100 comprises a cooling unit 175 disposed at a front portion thereof. The cooling unit 175 can be configured to cool one or more systems of the motorized device 100. In one implementation, the cooling unit 175 may be configured to cool the electric machine unit 150. The electric machine unit 150 of the present subject matter is configured to provide power and torque with optimal usage of power from the power source.

Figure 2:
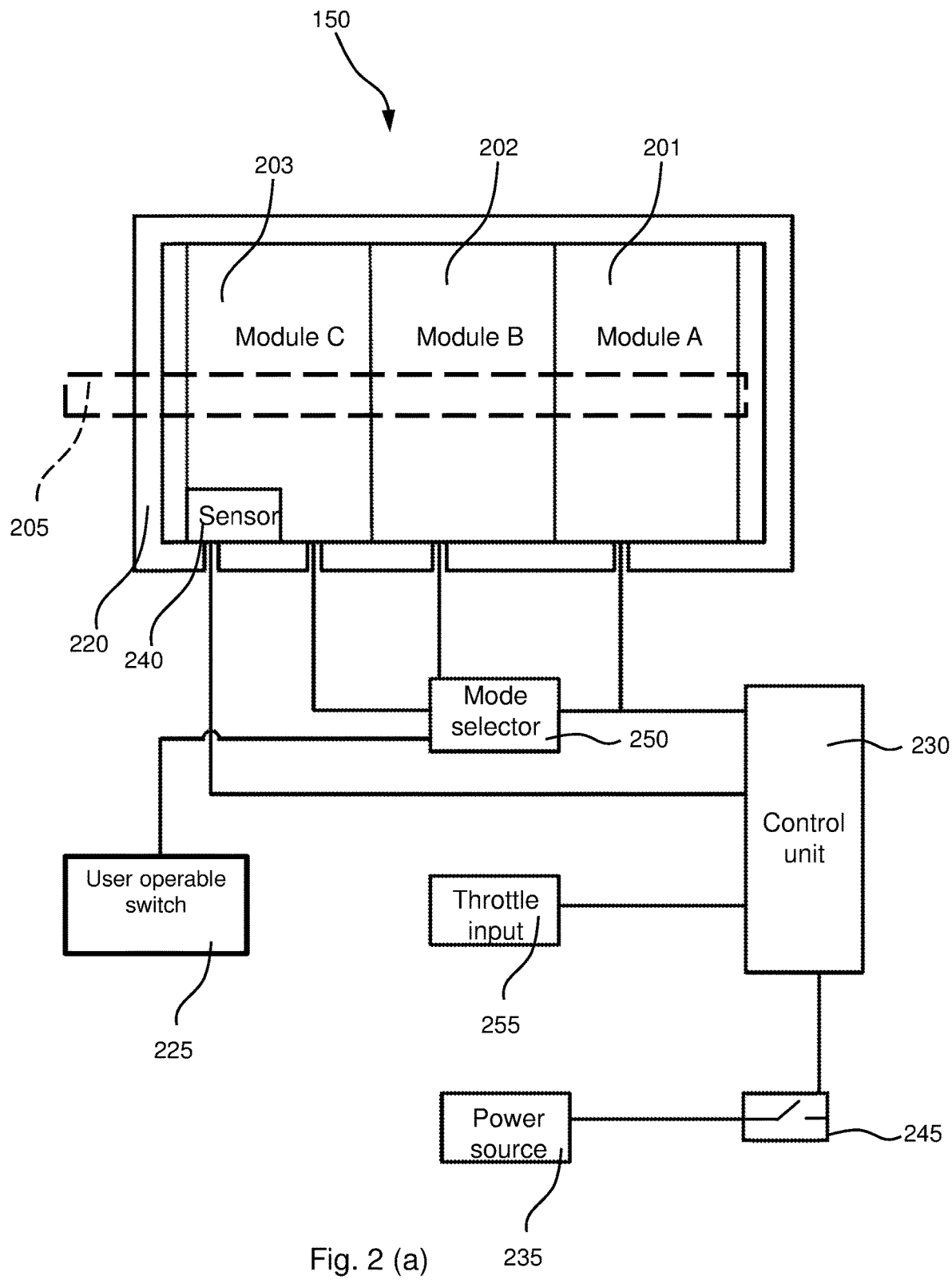
FIG. 2 (*a*) depicts a schematic view of an electric machine unit, in accordance with an embodiment of the present subject matter.
Figure 2:
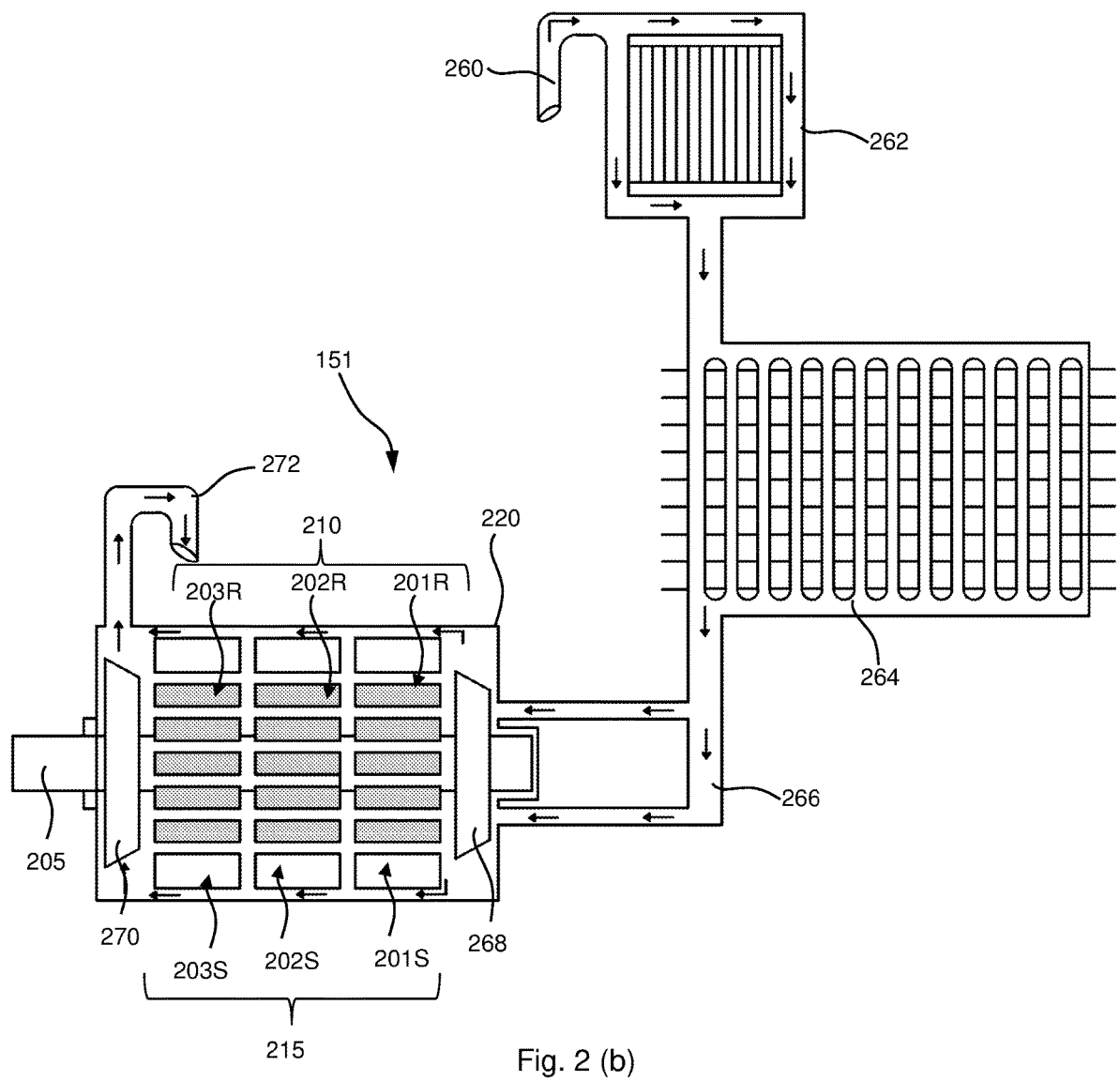

FIG. 2 (a) depicts a schematic view of an electric machine unit, in accordance with an embodiment of the present subject matter. The electric machine unit 150 comprises a rotor shaft 205 extending along a substantial length (long axis) direction thereof. The electric machine unit 150 comprises a rotor assembly 210 and a stator assembly 215 (as shown in FIG. 2 (b)). The rotor assembly 210 comprises plurality of rotor members (not shown in this schematic view). Similarly, the stator assembly 215 comprises plurality of stator members (not shown in this schematic view) which is configured to work in conjunction with a corresponding plurality of rotor member. The plurality of rotor members and the plurality of stator members are disposed in an axially aligned manner. One rotor member and a corresponding stator member act as one motor module. In the depicted embodiment, three motor modules are provided viz. motor module A, motor module B and motor module C referred by the reference numerals 201, 202 and 203 respectively. The electric machine unit 150 comprises a casing 220 and the motor modules 201, 202 and 203 are packaged inside the casing 220. Each of the motor modules 201, 202 or 203 is capable of operating as an individual motor that can be controlled by a mode selector 250. All the three motor modules 201, 202 and 203 comprise the common rotor shaft 295 and the common housing 220. In one embodiment, the mode selector 250 is an electromechanical switch capable of being operated mechanically for establishing electrical contact. All the stator members are mounted to the rotor shaft 205 and rotate along with the rotor shaft 205. In one embodiment, each of the rotor members is provided with plurality of magnetic members. Each of the stator members is provided with a core and plurality of teeth/slots. Each stator member works in conjunction with a corresponding rotor member. In other words, the electromagnetic flux from the windings of the rotor member engages with the corresponding stator member. Electrical conductor windings are wound about the plurality of teeth in any known configuration. Some of the possible exemplary configurations include a star or delta configurations with one or more phases.

The mode selector 250 is configured to enable inducement of electrical current in one or more stator members of the stator assembly 215. The mode selector 250 can be operated by a rider operable switch 225, which can be provided on a handlebar assembly 145 (as shown in FIG. 1). The mode selector can be a separate switch. In one implement, the mode selector can be similar to a shift lever provided on the handle bar, which the rider can operate by rotating. In yet another implementation, the mode selector can be shift lever that can be operated similar to a conventional gear shift lever. A power source 235 like a battery pack is provided to supply necessary voltage and current to the motor modules 201, 202 or 203. In one embodiment, a single set of sensors 240 are capable of generating signals indicative of an angular position of the rotor shaft 205. In spite of the multiple motor modules, a single set of sensors 240 can provide the angular position of the rotor members to induce the electrical conductor windings in the stator assembly. A power switch 245 is provided to switch ON and OFF the system including the electric machine unit 150. In the motorized device, the power switch 245 can be integrated with an ignition key of the motorized device 100. In another embodiment, the power switch 245 can be provided as a separate switch on the handlebar assembly 145 (shown in FIG. 1). In one embodiment, a mode selector 250 is provided to select operation of one or more motor modules 201, 22 and 203 of the stator assembly. In one implementation, the rider can select various modes to activate one or more motor modules 201, 22 and 203 of the electric machine unit 150. For example, during a steep hill climb, the rider can operate the mode selector to engage all the motor modules in the electric machine unit 150 to achieve the desired torque and power.

Further, a control unit 230 is provided to supply electrical energy from the power source 235 to the motor modules 201, 22 and 203 in a controlled manner. Data from the sensor 240 is retrieved by the control unit 230 in order to selectively induce current across various windings of one more stator members of the stator assembly 215. A throttle input 255 is provided to communicate the power/torque requirements by the rider. The mode selector 250 is configured to select the motor modules required for operation. The throttle input 255 is configured to provide an input to the control unit 230 whereby the control unit 230 provides a pre-determined pulse signal and voltage/current to the motor modules that brought into operation by the mode selector 250. In one embodiment, the throttle input 255 is integrated on a handlebar assembly 145 (shown in FIG. 1). The throttle input 255 can be rotatable-type, which can be rotated to demand power/torque by the rider. In another implementation, the throttle input 255 can be integrated with a pedal, which can be operated by foot by the rider.

FIG. 2 (b) illustrates a schematic view of an electric machine unit, in accordance with an embodiment of the present subject matter. The electric machine unit 151, in the depicted embodiment, comprises a rotor assembly 210 and stator assembly 215. In the exemplary embodiment, as illustrated, the rotor assembly 210 comprises three rotor members 201R, 202R, 203R that are disposed on the rotor shaft 205 and are axially aligned. In one embodiment, each of the rotor members 201R, 202R, 203R is configured with plurality of magnetic plates. Each stator member along with a corresponding rotor member forms a motor module, which can operate as an electric motor. Each motor module forms a combination of the stator member and the corresponding rotor member can drive the rotor shaft 205.

The following example provides an understating of operation of motor modules of the electric machine unit 151 as per the present invention. The example is not intended for limiting the scope of the present invention. In order to provide an electric machine unit with 1000 W capacity, various combinations of motor module capacities can be used. In one example, a first motor module 201S, 210R can be a motor with a 400 W mechanical power. The second motor module 202S, 202R can be a motor with a capability of generating 300 W mechanical power. A third motor module 203S, 203R can be a motor capable of generating 300 W mechanical power. During starting or a hill climb, two or more of the motor modules can be enabled by the rider through a mode selector 250 (shown in FIG. 2 (a)). Further, when cruising, the rider can select to operate only one motor module depending on the cruising speed. This enables selective operation of the motor modules by the rider, thereby enabling optimal usage of power.

In one embodiment, the mode selector 250 is configured to operate one or more motor modules of the electric machine unit 151. The control unit 230 is connected to all the motor modules of the electric machine unit 151. Depending on the throttle input 255 and the status of the electric machine unit 151 (depending on number of motor modules being operational), the control unit 230 supplies current to the electric machine unit 151 in a controller manner from the power source 235.

Further, the rotor assembly 210 and the stator assembly 215 are stacked within a casing 220. In one implementation, one or more fans are provided within the housing 220 and fans are mounted to the rotor shaft 205. During operation of the electric machine unit 151, the fans agitate air therein and circulate air within the housing for distribution and dissipation of heat from the entire housing 220.

In one embodiment, as illustrated in FIG. 2 (b), the electric machine unit 151 is provided with a forced air-cooling system. The forced air-cooling system comprises an air inlet 260. Air is drawn through the air inlet 260 and is passed through a filter unit 262. The filter unit 262 is configured to filter dust, moisture and any other foreign particles. The filtered air from the filter unit 262 is transferred to a cooling unit 264. The cooling unit 264 can be a cooling coil or a condenser configured to reduce the temperature of the air. The cooled air from the cooling unit 264 is transferred to a unit-inlet 266, which directs air towards intake fan 268. In other words, an intake fan 268 creates a suction to draw ambient air from the atmosphere into the electric machine unit 151. The intake fan 268 is disposed on one axial end, which is axially adjacent to a motor module. Similarly, an exhaust fan 270 is disposed at another axial end. In one implementation, the intake fan 268 and the exhaust fan 270 rotate along with the rotor shaft 205 thereby enabling circulation and movement of air. Further, the electric machine unit 151 is provided with a unit-outlet 272 to expel the air from the casing 200. The cooled air entering the casing 220 enables cooling of the stator members 201S, 202S, 203S and the rotor members 201R, 202R and 203R. By convection, heat is absorbed from the components that operate at high currents and heated air is expelled from the electric machine unit 151. The intake fan 268 and exhaust fan 270 along with the filter unit 262 and the cooling unit 264 allow cooling of the electric machine unit 151. Thus, the electric machine unit 151 can be continuously operated at high loads, say by operating all motor modules or one or more motor modules at high power, without performance deterioration or degradation. In one implementation, the cooling unit 175 (as shown in FIG. 1) operates as the cooling unit 264. The cooling unit 175/264 is secured to the frame assembly 105 and is disposed rearward to the front wheel 120 (as shown in FIG. 1).

Figure 3:
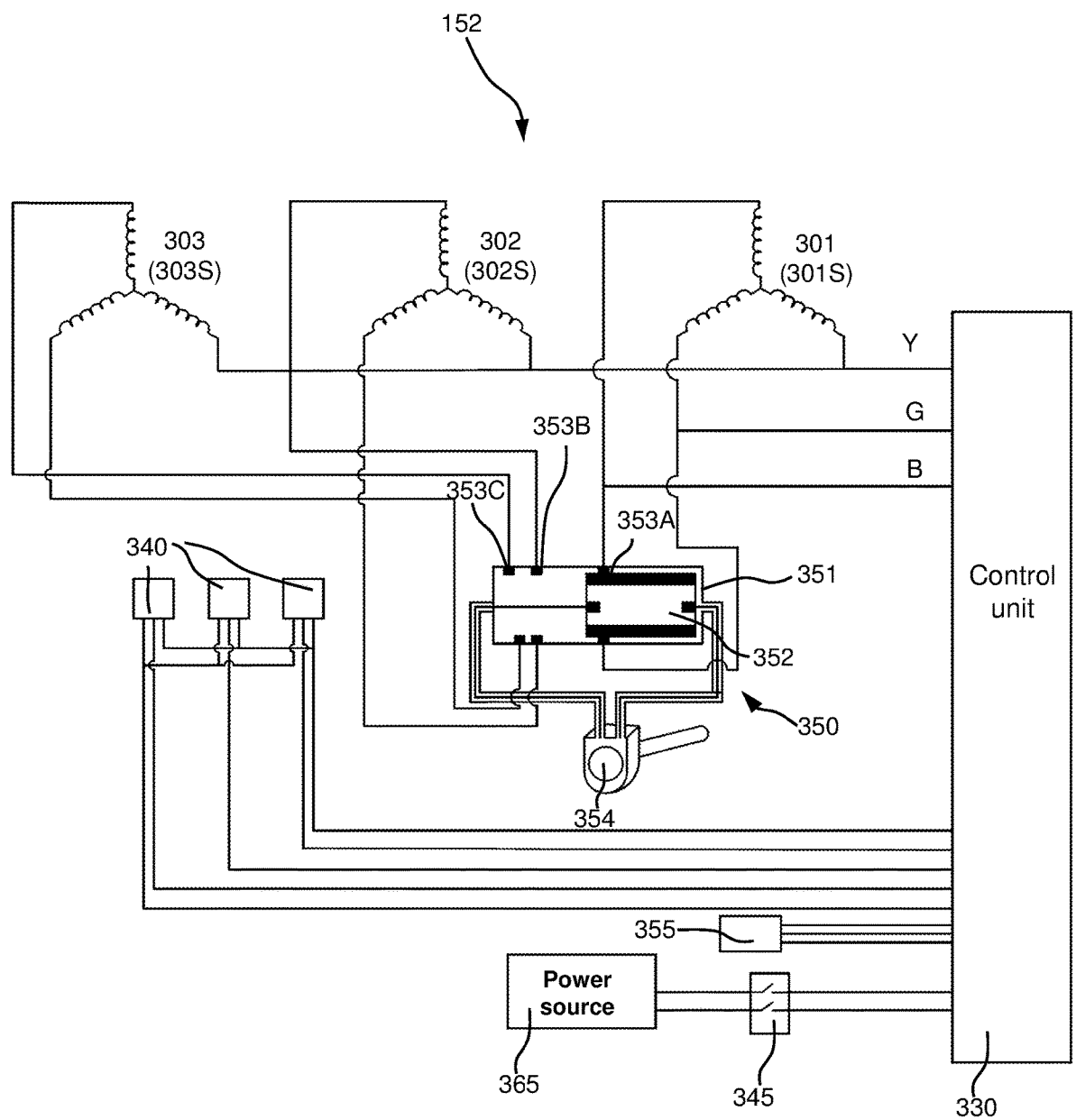
FIG. 3 illustrates a schematic circuit diagram of an electric machine unit, in accordance with an embodiment of the present subject matter.

FIG. 3 illustrates a schematic circuit diagram of an electric machine unit, in accordance with an embodiment of the present subject matter. In one embodiment, each rotor member of the rotor assembly (not show) comprises plurality of radially magnetized permanent magnets (not shown) acting as magnetic members in alternating pattern. In the depicted embodiment, the electric machine unit 152 comprises three motor modules 301, 302, 303 (schematically only windings are shown). In one implementation, windings of stator members of the motor modules 301, 302, 303 are connected in star pattern. The winding pattern is not limited to the star pattern and may include delta or any other known pattern. A control unit 330 is connected to a power source 365 through a power switch 345. In one embodiment, a plurality of output lines Y, G, B connect the motor modules 301, 302, 303 to the control unit 330. The control unit 330 is capable of energizing the motor modules by drawing power from the power source 365.

In one embodiment, the motor modules 301, 302, 302, especially the winding of the stator members, are connected to the control unit 330 through a mode selector 350. The mode selector 350 comprises a housing 351. The housing 351 supports a connector member 352, which is slidable inside the housing 351. In one implementation, at least one output line is directly connected to the windings and the other output lines are connected to the control unit 330 through the mode selector 350. For example, considering the first winding corresponding to the first motor module, 301, the output lines Y, G are directly connected to the control unit 330. The output line B is connected to terminals 353A (provided on opposite sides) on the mode selector 350. The connector member 352 establishes electrical contact between the terminals 353A (which are connected through the connector member 352 forming a conducting contact) and thereby forming a connection to the output line B and to the control unit 330. Similarly, terminals 353B, 353C are provided, which correspond to the motor modules 302, 303. Thus, even though the control unit 330 is configured to energize all the motor modules 301, 302, 303, the mode selectors 350 selects which motor modules (windings) are to be additionally energized. In one embodiment, the mode selector, when at default position, selects one motor module and then additionally energizes the additional motor modules depending on the position of the mode selector. In another embodiment, the mode selector is configured to select any one of the one motor modules (as motor modules can be of different configurations), or any combination of two or more motor modules (as different combination of two or more motor modules can deliver different output).

When the rider turns ON the power switch 345, the power source 365 is connected with the control unit 330. The number of windings of the stator assembly that get excited with currents will be based on the mode selector 350. The torque variable switch position is in turn based on the torque selecting switch position that can be controlled by the rider. In order to obtain maximum torque/power, the mode selector 350 will be moved to a position that establishes electrical connecting for all the windings. This allows all three motor modules 301, 302, 303 to be energized and high torque is generated, for conditions like moving the motorized device from halt condition. Considering an example similar to aforementioned configuration, the electric machine unit 152 is capable of providing a total power of 1000 W, which is formed by motor modules of capacities 400 W, 300 W, and 300 W. When all three motor modules are operational, a capacity of 1000 W is generated. Once a speed of the motorized device 100 exceeds a first predetermined limit, say 15 kmph in accordance with one embodiment, Subsequently, the mode selector 350 is operated to reduce the number of motor modules getting energized, (i.e. 700 W as per the earlier example), which is achieved from two motor modules being energized. The amount of power consumed is reduced, while generating sufficient mechanical power to operate the device/vehicle. Further, when the speed exceeds a second predetermined limit, say 30 kmph in accordance with one embodiment, the mode selector 350 is operated to energize only one motor module at 400 W or 300 W, as per earlier example. This further reduces power consumption by the electric machine unit 152.

In one embodiment, the mode selector 350 comprises a rider operable switch 354. The rider operable switch 354 enables the rider to select the one or more machines to be energized depending on his riding conditions. If the rider encounters an uphill, the mode selector 350 is operated to energize the motor modules 301, 302, and 303 in order to generate higher torque for climbing the up-hill. The rider provides the throttle input 355, which is sensed by the control unit 330 by receiving signals from a throttle position sensor or the like. In one embodiment, a potentiometer type throttle position sensor is used and non-contact type hall-effect sensors 340 based rotor position sensor are used to provide information about angular position of the rotor assembly. The control unit 330 accordingly provides current to the electric machine unit 152 as per the demand by the rider. In one embodiment, the mode selector is fixed on a handlebar assembly 145 of the motorized device 100 (shown in FIG. 1). In one embodiment, the mode selector 350 with the rider operable switch 354 can be operated similar to gear engagement mechanism provided on some two-wheeled or three-wheeled vehicles. The rider has to rotate the rider operable switch provided on the handlebar by angularly rotating a portion of the handlebar assembly to two or more positions.

Figure 4:
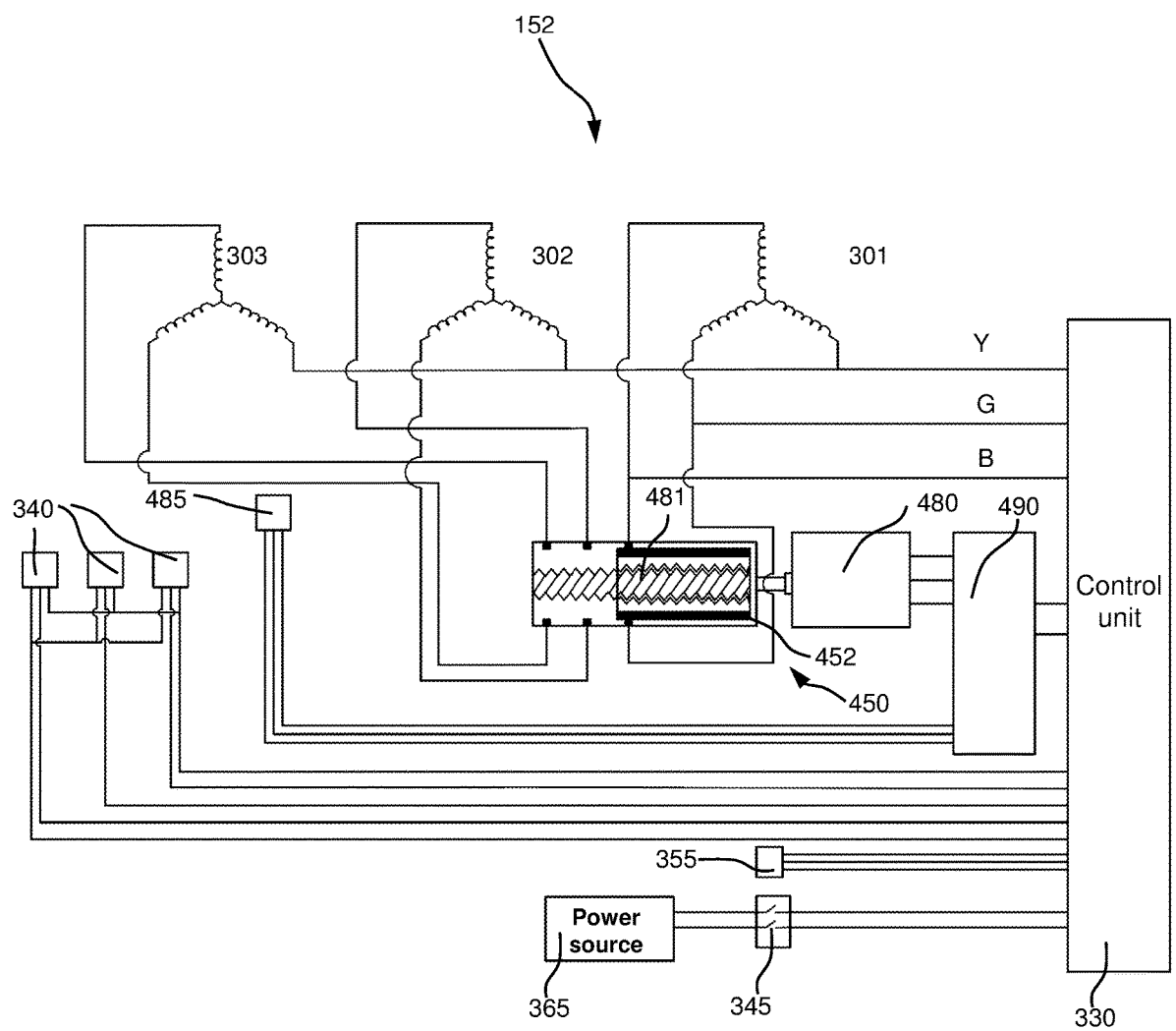
FIG. 4 illustrates another implementation of an electric machine unit, in accordance with an embodiment as illustrated in FIG. 3.

FIG. 4 illustrates another implementation of an electric machine unit, in accordance with an embodiment as illustrated in FIG. 3. The control unit 330 is further configured to automatically operate a mode selector 450 without any need for rider operating it. The mode selector 450, in one embodiment, is operated by an operating member 480 like a servo motor, a solenoid member or the like. In the depicted embodiment, the servo motor acts as an operating member 480. The operating member 480, is connected with a worm gear 481. A connector member 452 is mounted to the worm gear 481. Rotation of worm gear 481 by the operating member 480 causes movement of the connector member 452 forming electrical connection between the coils. The servo motor acting as operating member 480 is in turn controlled by the control unit 330 based on one or more parameters of the motorized device 100. In one implementation, the control unit 330 receives data from a throttle position sensor 485. The control unit 330 understands the torque demand based on throttle opening and one or more other parameter like speed and accordingly operates the mode selector 450.

In one embodiment, the servo motor (operating member 480) and worm gear 481 are eliminated. Electronic switches such as metal oxide semiconductor field effect transistors (MOSFETs), insulated-gate bipolar transistor (IGBTs) or the like are provided to establish electrical contacts for the windings. The electronic switches can be integrated with the control unit 330. An automatic torque variable unit 490 may be separately provided or can be integrated with the control unit 330 to perform the sensing of one or more parameters of the motorized device 100 and to operate the mode selector 450.

Figure 5:
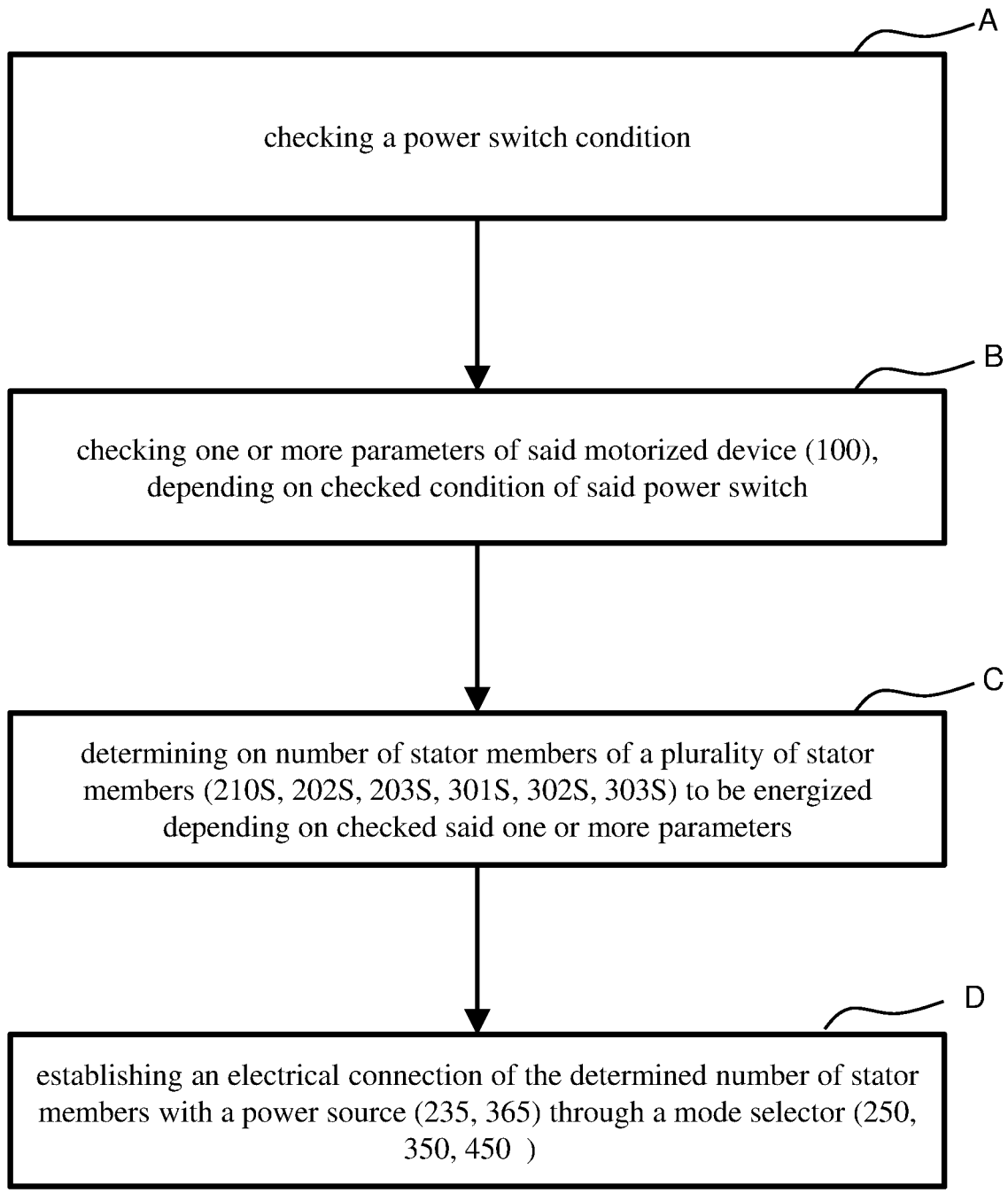
FIG. 5 (*a*) illustrates a method of operation of an electric machine unit, in accordance with an embodiment of the present subject matter.
Figure 5:
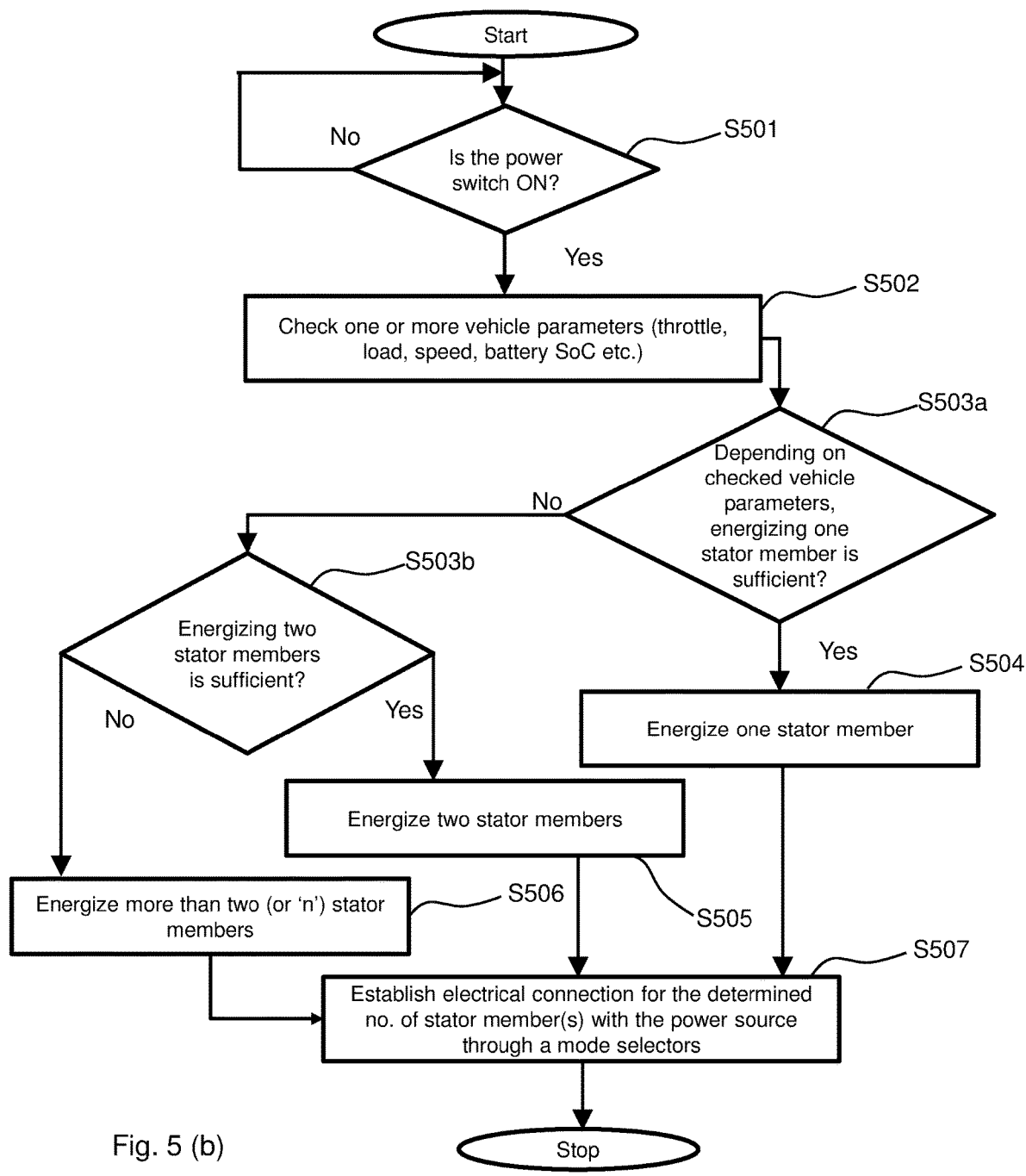

FIG. 5 (a) illustrates a method of operation of an electric machine unit, in accordance with an embodiment of the present subject matter. At step A, the electric machine unit 150, 151, 152 performs checking a power switch 245, 345 condition. Then at step B, the electric machine unit 150, 151, 152 performs checking one or more parameters of the motorized device 100, depending on checked condition of the power switch 245, 345. Then at step C, the electric machine unit 150, 151, 152 performs determining on number of stator members of a plurality of stator members 210S, 202S, 203S, 301S, 302S, 303S to be energized depending on checked one or more parameters of the motorized device. At step D, the electric machine unit 150, 151, 152 establishes an electrical connection of the determined number of stator members with a power source 235, 365 through the mode selector 250, 350, 450.

FIG. 5 (b) illustrates a method of operation of an electric machine unit, in accordance with an embodiment of the present subject matter. A method of operation of an electric machine unit 150, 151, 152 for a motorized device 100 comprises the following steps. For ease of understanding the steps are explained in the following order. However, the sequence of steps is not limited to the ordered described herein and can be operational when re-arranged with different permutations. The reference signs used hereafter for explanation of the method may be related to one or more embodiments discussed earlier.

At step S501, a power switch 245, 345 condition is checked by a control unit 230, 330. At step S502, one or more parameters of the motorized device 100 are checked by the control unit 230, 330 in case of a novice rider. The one or more parameters, in one embodiment, include a load, a vehicle speed, a throttle condition, or a battery SoC. The one or more parameters are checked through sensors corresponding to the parameters being measured/checked. In case of an experienced rider, the rider can estimate the parameters. At steps S503a, S503b, depending on the checked parameters of the vehicle, one or more stator members of a plurality of stator members of the electric machine are selected for driving the motorized device. For example, the control unit 230, 330 receives the checked/measured one or more motorized device parameters with corresponding values in a look-up table. Accordingly, at steps S504, S505 & S506, the number of stator members of the plurality of stator members 210S, 202S, 203S, 301S, 302S, 303S, which are to energized is decided. At step S507, an electrical connection for the determined number of stator members with a power source 235, 365 is established through a mode selector 250, 350, 450. In one embodiment, the mode selector 350 enables the rider to manually perform the switching or selection operation. In other embodiment, the control unit 230, 330 is configured to perform establishing electrical connection through, say, an electro-mechanical member.

The electric machine unit 150, 151, 152 can be used in any two-wheeled, three-wheeled or small capacity four-wheeled vehicles. The electric machine unit can be used to achieve a pure-electric vehicle or a hybrid-electric vehicle. In a hybrid vehicle, the electric machine unit could be mated with an internal combustion engine or can act as a stand along drive unit.

While certain features of the claimed subject matter have been illustrated and described herein, many modifications, substitutions, changes, and equivalents will now occur to those skilled in the art. It is, therefore, to be understood that the appended claims are intended to cover all such modifications and changes that fall within the true spirit of the claimed subject matter.

List of reference signs:

| | |
|---|---|
| 100 | motorized device |
| 105 | frame assembly |
| 110 | head tube |
| 115 | main tube |
| 120 | front wheel |
| 125 | rear wheel |
| 130 | front suspension |
| 135 | swing arm |
| 140 | rear suspension |
| 145 | handle assembly |
| 150/151/152 | electric machine unit |
| 155 | transmission system |
| 160 | drive member |
| 165 | driven member |
| 170 | storage unit |
| 175/264 | cooling unit |
| 201/202/203/301/302/303 | motor module |
| 201R/202R/203R | rotor |
| 201S/202S/203S/301S/302S/303S | stator |
| 205 | rotor shaft |
| 210 | rotor assembly |
| 215 | stator assembly |
| 220/320 | casing |
| 225/354 | rider operable switch |
| 230/330 | control unit |
| 240/340 | sensor member(s) |
| 245/345 | power source |
| 250/350/450 | mode selector |
| 255 | throttle input |
| 260 | air inlet |
| 262 | filter unit |
| 266 | unit-inlet |
| 268 | intake fan |

-continued

List of reference signs:

| | |
|---|---|
| 270 | exhaust fan |
| 272 | unit-outlet |
| 351 | housing |
| 352/452 | connector member |
| 353A/353B/353C | terminals |
| 355 | throttle input |
| 480 | operating member |
| 481 | worm gear |
| 485 | throttle position sensor |
| 490 | automatic torque variable unit |

We claim:

1. An electric machine unit for a motorized device, said electric machine unit comprising:
a rotor assembly comprising:
rotor members; and
a rotor shaft configured to support said rotor assembly, wherein said rotor assembly is capable of rotating along with said rotor shaft; and
a stator assembly comprising:
stator members, wherein each stator member is configured to work in conjunction with a corresponding rotor member of the rotor members; and
a mode selector configured to enable operation of one or more of said stator members to rotate said rotor shaft depending one or more parameters of said motorized device, wherein
said rotor assembly and said stator assembly are housed within a casing of said electric machine unit,
said rotor shaft supports an intake fan and an exhaust fan, wherein said intake fan and said exhaust fan are disposed at axial ends of said rotor shaft, and
said intake fan and said exhaust fan are enclosed by said casing,
said casing is connected to an unit-inlet configured to provide purified air from a filter unit,
said intake fan is configured to circulate air in the casing, and
said exhaust fan is capable of directing air out through an unit-outlet connected to said casing.

2. The electric machine unit for the motorized device as claimed in claim 1, wherein said stator members are configured to be energized through a control unit by drawing power from a power source of the motorized device.

3. The electric machine unit for the motorized device as claimed in claim 1, wherein
said mode selector is an electromechanical switch capable of being operated by a rider operable switch, and
said mode selector is configured to establish electrical connection between one or more windings of said stator assembly.

4. The electric machine unit for the motorized device as claimed in claim 1, wherein
said mode selector is an electromechanical switch, and
said mode selector is capable of being operated by an actuating member controlled by a control unit of said motorized device.

5. The electric machine unit for the motorized device as claimed in claim 1, wherein said mode selector is integrally formed with a control unit of said motorized device.

6. The electric machine unit for the motorized device as claimed in claim 1, wherein said filter unit is connected to a cooling unit configured to reduce temperature of air before entering said unit-inlet.

7. The electric machine unit for the motorized device as claimed in claim 6, wherein
said motorized device is a motor vehicle comprising a frame assembly,
said cooling unit is mounted to said frame assembly, and
said cooling unit is disposed in vicinity of one of at least one front wheel and at least one rear wheel of said motor vehicle.

8. The electric machine unit for the motorized device as claimed in claim 1, wherein said mode selector is configured to cumulatively operate two or more stator members of said stator members depending on said one or more parameters of said motorized device.

9. The electric machine unit for the motorized device as claimed in claim 1, wherein said mode selector is configured to operate any one or more of said stator members depending on said one or more parameters of said motorized device.

10. A method of operation of an electric machine unit for a motorized device, said method comprising:
checking, by a mode selector, a condition of a power switch of said motorized device;
checking, by said mode selector, one or more parameters of said motorized device, depending on said power switch condition;
determining, by said mode selector, two or more stator members from three or more stator members to be energized depending on said one or more parameters; and
establishing, by said mode selector, an electrical connection of the determined two or more stator members with a power source.

* * * * *